(12) United States Patent
Mathis (10) Patent No.: US 7,887,268 B2
(45) Date of Patent: Feb. 15, 2011

(54) DRILL SPINDLES WITH INLINE DIRECT DRIVE FEED

(75) Inventor: Dennis R. Mathis, St. Peters, MO (US)

(73) Assignee: The Boeing Company, Chicago, IL (US)

( * ) Notice: Subject to any disclaimer, the term of this patent is extended or adjusted under 35 U.S.C. 154(b) by 998 days.

(21) Appl. No.: 11/690,793

(22) Filed: Mar. 23, 2007

(65) Prior Publication Data

US 2008/0232914 A1 Sep. 25, 2008

(51) Int. Cl.
*B23B 35/00* (2006.01)
*B23B 47/18* (2006.01)

(52) U.S. Cl. .................. 408/1 R; 408/101; 408/138

(58) Field of Classification Search .............. 173/141, 173/152, 165, 150; 408/1 R, 99–102, 124, 408/129, 138, 141, 702; 409/231; *B23B 47/18*
See application file for complete search history.

(56) References Cited

U.S. PATENT DOCUMENTS

| 2,738,692 | A | * | 3/1956 | Jones ........................ 408/11 |
| 2,854,871 | A | * | 10/1958 | Stratman .................... 173/157 |
| 2,857,789 | A | * | 10/1958 | Robinson ..................... 408/11 |
| 2,860,531 | A | * | 11/1958 | De Groff ..................... 408/130 |
| 2,869,403 | A | * | 1/1959 | Bent .......................... 408/130 |
| 3,141,509 | A | * | 7/1964 | Bent .......................... 173/19 |
| 4,187,045 | A | * | 2/1980 | Fischer ....................... 408/240 |
| 4,274,642 | A | * | 6/1981 | Wunsch ...................... 279/62 |
| 4,317,578 | A | * | 3/1982 | Welch ........................ 279/60 |
| 4,752,161 | A | * | 6/1988 | Hill ............................ 408/67 |
| 5,100,271 | A | * | 3/1992 | Kameyama et al. ......... 409/231 |
| 5,350,263 | A | * | 9/1994 | Fedeli ........................ 409/231 |
| 7,722,298 | B2 | * | 5/2010 | Russell ....................... 408/1 R |

* cited by examiner

Primary Examiner—Daniel W Howell
(74) Attorney, Agent, or Firm—Lee & Hayes, PLLC (57) ABSTRACT

Spindle assemblies with inline direct drive feed are disclosed. In one embodiment, a manufacturing system includes a support structure configured to be positioned proximate a workpiece, a carriage moveably coupled to the support structure, and a head assembly coupled to the carriage. The head assembly includes a spindle assembly, comprising a feed unit and a spindle unit. The feed unit includes a feed motor coupled to a drive mechanism, the feed motor and the drive mechanism being disposed along a longitudinal axis of the spindle assembly. The spindle unit has an aft end operatively coupled to the drive mechanism of the feed unit, the spindle unit including a fluid-driven motor coupled to a tool collet chuck, the spindle unit being configured to translate along the longitudinal axis by actuation of the feed motor.

20 Claims, 9 Drawing Sheets

DRILL SPINDLES WITH INLINE DIRECT DRIVE FEED

CROSS REFERENCE TO RELATED APPLICATIONS

This patent application is related to and claims priority to commonly-owned U.S. patent application Ser. No. 11/690,783 entitled "Concentric Clamping for Drill Spindles" filed on Mar. 23, 2007.

FIELD OF THE INVENTION

The field of the present disclosure relates to drill spindles for drilling equipment, and more specifically, to methods and systems for drill spindles with inline direct drive feed.

BACKGROUND OF THE INVENTION

A variety of quill spindles for performing machining operations are known. In general, quill spindles include a motor that rotates a tool spindle (e.g. a drill spindle), and a feed unit that advances the rotating tool spindle toward a workpiece. Quill spindles for drilling may be used in cooperation with a clamping assembly that securely clamps the workpiece and stabilizes the drill spindle during drilling operations.

There are a number of existing drill spindles with quill feed. The small compact units typically use non-programmable hydraulic feed control, while others use a leadscrew feed mechanism with a drive axis that is parallel to, but offset from, a drilling axis of the drill spindle. More specifically, either the motor is offset with a belt or gearing transferring power from the motor to the leadscrew, or the entire feed system is offset with the spindle attached to a feed axis powered slide.

Although desirable results have been achieved using prior art drill spindles with quill feed, there is room for improvement. For example, to provide repeatable countersink depth precision, relatively rigid systems are required. Existing drill spindles with quill feed that provide the desired rigidity, however, are relatively bulky and heavy, and are incompatible with some types of clamping systems. Therefore, novel drill spindles with quill feed that provide the desired rigidity and that are lighter and less bulky than the prior art systems would have utility.

SUMMARY

The present disclosure teaches quill spindles with inline direct drive feed for performing machining operations, including drilling operations. Quill spindles in accordance with the present disclosure may advantageously provide improved rigidity and precision, and may be lighter and less bulky, than comparable prior art systems. Embodiments of quill spindles in accordance with the present disclosure may be compatible with a greater variety of clamping systems, including concentrically-disposed clamping systems.

In one embodiment, a spindle assembly includes a feed unit and a spindle unit. The feed unit includes a feed motor coupled to a drive mechanism, the feed motor and the drive mechanism being disposed along a longitudinal axis of the spindle assembly. The spindle unit has an aft end operatively coupled to the drive mechanism of the feed unit, the spindle unit including a fluid-driven motor coupled to a tool collet chuck, the spindle unit being configured to translate along the longitudinal axis by actuation of the feed motor.

In another embodiment, a manufacturing system includes a support structure configured to be positioned proximate a workpiece, a carriage moveably coupled to the support structure, and a head assembly coupled to the carriage. The head assembly includes a spindle assembly, comprising a feed unit and a spindle unit. The feed unit includes a feed motor coupled to a drive mechanism, the feed motor and the drive mechanism being disposed along a longitudinal axis of the spindle assembly. The spindle unit has an aft end operatively coupled to the drive mechanism of the feed unit, the spindle unit including a fluid-driven motor coupled to a tool collet chuck, the spindle unit being configured to translate along the longitudinal axis by actuation of the feed motor.

In a further embodiment, a method of performing a drilling operation includes providing a spindle assembly configured to perform a drilling operation at a drilling location on a workpiece, the spindle assembly including a feed unit having a feed motor coupled to a drive mechanism, the feed motor and the drive mechanism being disposed along a longitudinal axis of the spindle assembly; and a spindle unit having an aft end operatively coupled to the drive mechanism of the feed unit, the spindle unit including a fluid-driven motor coupled to a tool collet chuck, the spindle unit being configured to translate along the longitudinal axis by actuation of the feed motor. The method further includes operating the feed unit to drive the spindle unit toward the workpiece; and operating the spindle unit to perform the drilling operation at the drilling location on the workpiece using the spindle assembly.

The features, functions, and advantages that have been discussed can be achieved independently in various embodiments of the present invention or may be combined in yet other embodiments further details of which can be seen with reference to the following description and drawings.

BRIEF DESCRIPTION OF THE DRAWINGS

Embodiments of systems and methods in accordance with the teachings of the present disclosure are described in detail below with reference to the following drawings.

DETAILED DESCRIPTION

Quill spindles with inline direct drive feed for performing machining operations, including drilling operations, are disclosed in the following description. Many specific details of certain embodiments of the invention are set forth in the following description and in FIGS. 1-13 to provide a thorough understanding of such embodiments. One skilled in the art, however, will understand that the invention may have additional embodiments, or that the invention may be practiced without several of the details described in the following description.

Figure 1:
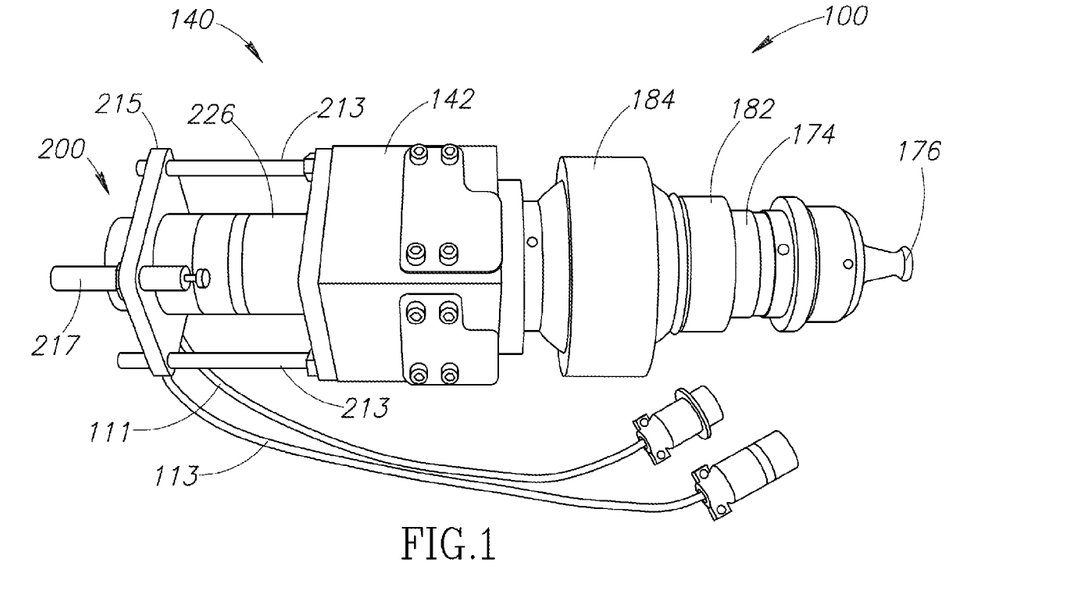
FIG. 1 is a side elevational view of a drill assembly in accordance with an embodiment of the invention.
Figure 2:
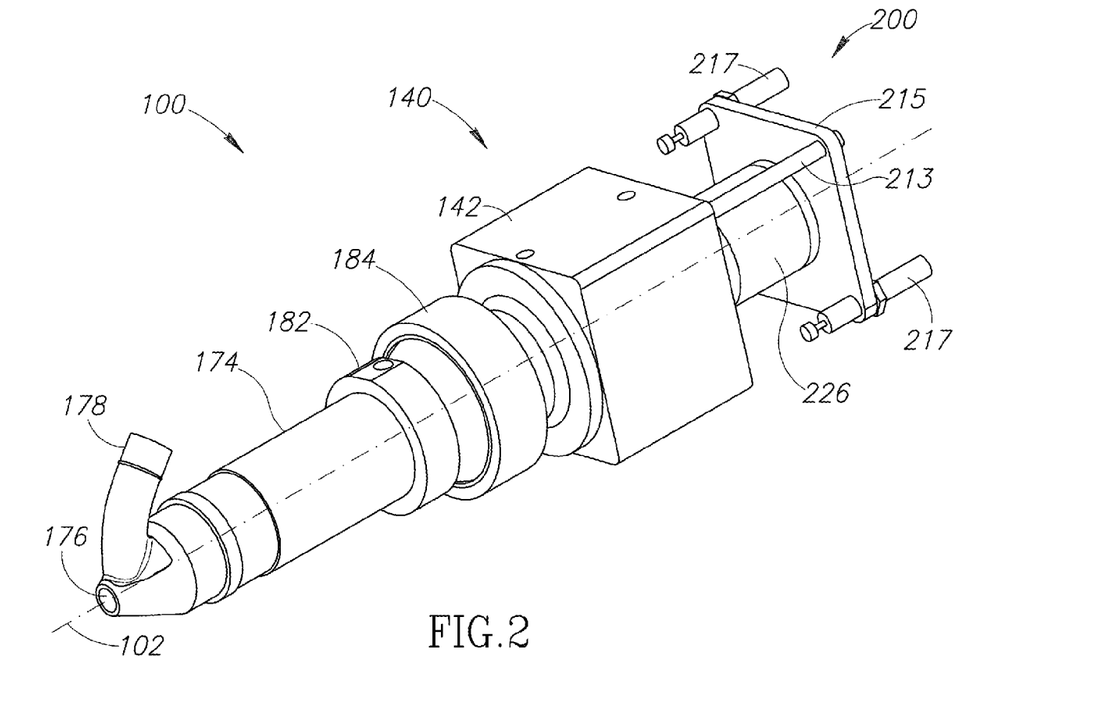
FIG. 2 is an isometric view of the drill assembly of FIG. 1.

FIGS. 1 and 2 are elevational and isometric views of a drill assembly 100 in accordance with an embodiment of the invention. In this embodiment, the drill assembly 100 includes a centrally-disposed spindle assembly 200 that performs the actual drilling operations on a workpiece, and an outer, concentrically-disposed clamping assembly 140 that clamps and secures the workpiece during the drilling operations performed by the spindle assembly 110. The spindle assembly 200 of the present disclosure is of a type known in the art as a "quill" spindle assembly, and is approximately centrally-disposed along a drilling axis 102. As described more fully below, the spindle assembly 200 includes one or more novel aspects that may provide significant advantages over the prior art.

General Overview

Figure 3:
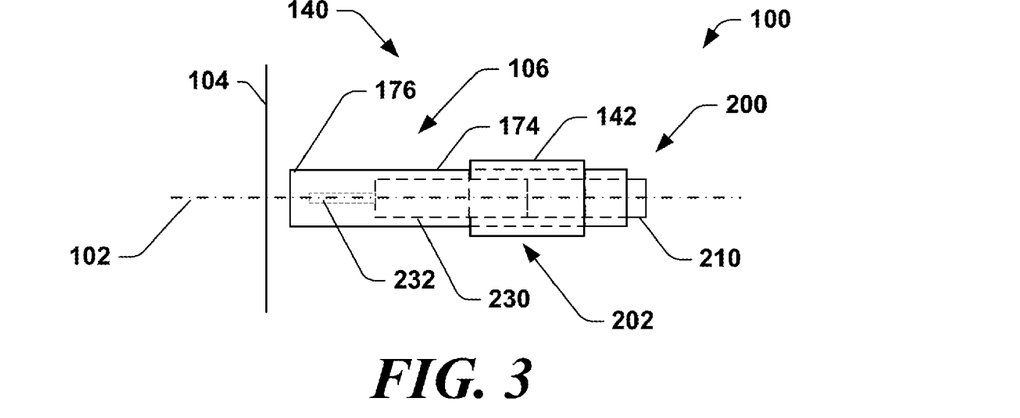
FIG. 3 is a side schematic representation of the drill assembly of FIG. 1 positioned proximate a workpiece.
Figure 4:
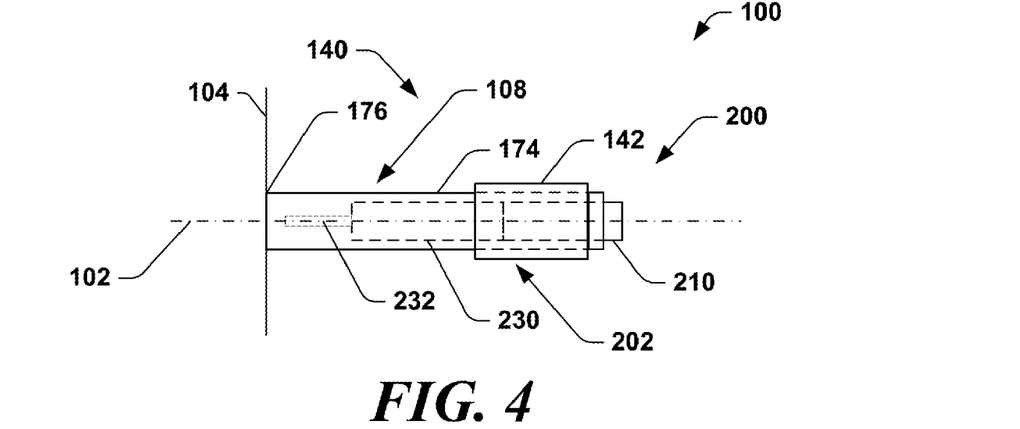
FIG. 4 is a side schematic representation of the drill assembly of FIG. 1 with a clamping assembly engaged with the workpiece.
Figure 5:
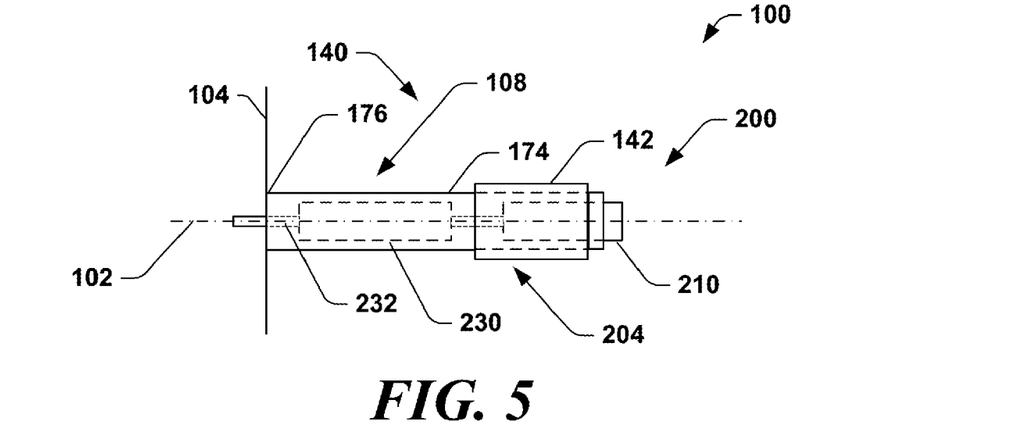
FIG. 5 is a side schematic representation of the drill assembly of FIG. 1 with the clamping assembly and a spindle assembly engaged with the workpiece.

To provide a conceptual understanding of the primary components and broad operational aspects of the drill assembly 100, and to set the stage for a more detailed description provided below, several basic aspects of the drill assembly 100 will be described with reference to FIGS. 3 through 6. More specifically, FIG. 3 shows a side schematic representation of the drill assembly 100 of FIG. 1. In this embodiment, the clamping assembly 140 includes a main housing 142 concentrically disposed about the spindle assembly 200, and an extension housing 174 that projects forwardly from the main housing 142 toward a workpiece 104. A nosepiece (or pressure foot) 176 may be positioned on the forward end of the extension housing 174. The spindle assembly 200 includes a feed unit 210 operatively coupled to a spindle unit 230. A manufacturing tool 232, such as a drill bit, is coupled to the spindle unit 230. In FIGS. 3 through 5, it will be appreciated that the components of the drilling assembly 100 are not drawn to scale, and portions of the spindle assembly 200 that are disposed within the clamping assembly 140 are shown in dotted lines.

Figure 6:
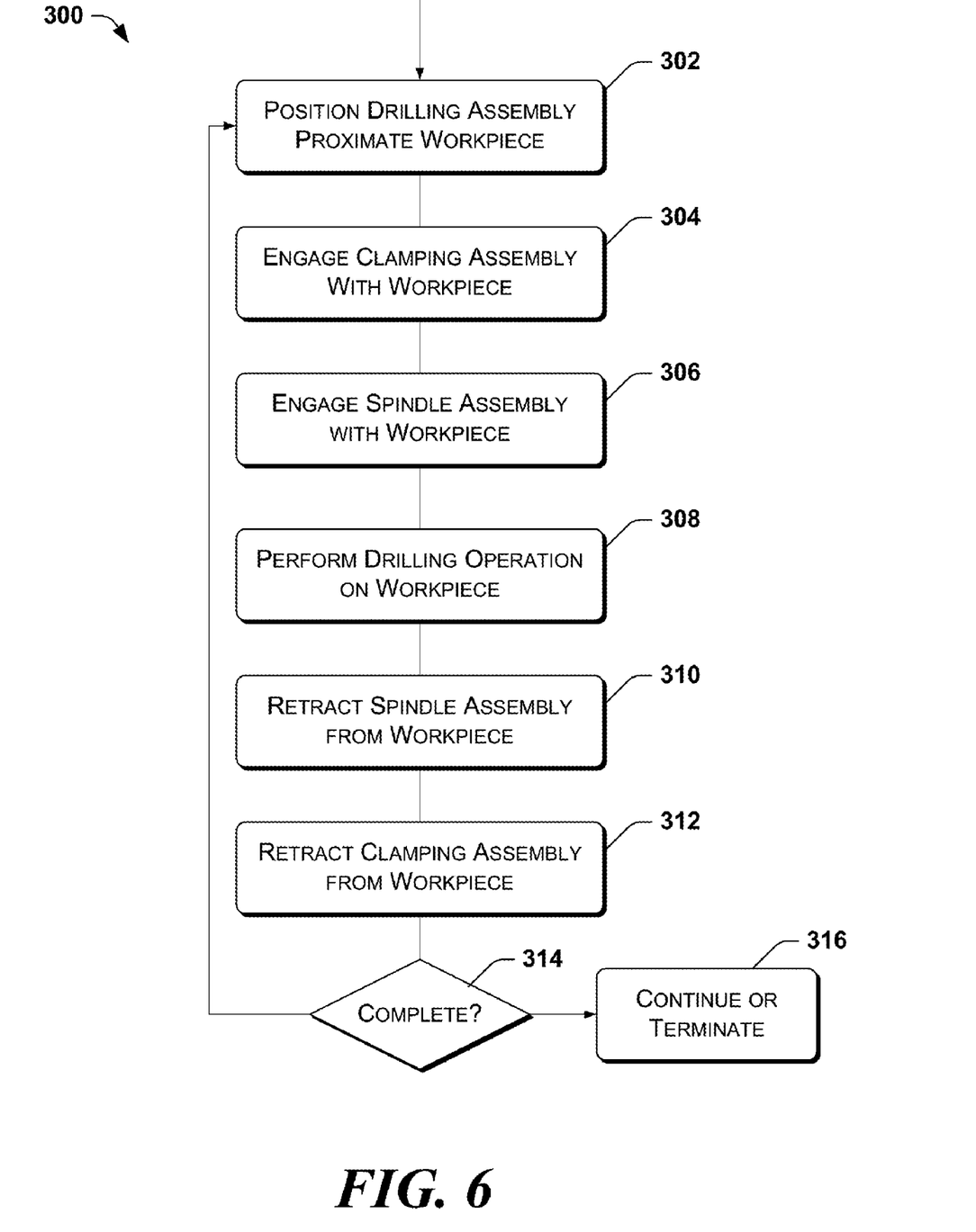
FIG. 6 is a flow chart of a method of performing drilling operations in accordance with another embodiment of the invention

FIG. 6 is a flow chart of a method 300 of performing drilling operations in accordance with a further embodiment of the invention. The method 300 is illustrated as a collection of blocks in a logical flow graph, which represents a sequence of operations that can be implemented in hardware, manual operations, software-controlled or automated operations, or a combination thereof. In the context of software-controlled and automated operations, the blocks represent computer instructions that, when executed by one or more processors, perform the recited operations. For discussion purposes, the method 300 is described with reference to the drilling assembly 100 shown in FIGS. 1 through 5.

With reference to FIG. 6, the method 300 of performing a drilling operation may begin at 302 by positioning the drilling assembly 100 proximate the workpiece 104. In this position (FIG. 3), the extension housing 174 of the clamping assembly 140 may be in a retracted position 106, and the spindle unit 230 of the spindle assembly 200 may also be in a retracted position 202.

At 304, the clamping assembly 140 may be actuated to an extended position 108 (as shown in FIG. 4) by moving the extension housing 174 forwardly along the drilling axis 102 until the nosepiece 176 engages the workpiece 104. In this position, the clamping assembly 140 may apply a clamping force to the workpiece 104 while the spindle assembly 200 translates forward with the extension housing 174, but remains in the retracted position 202. Applying the clamping force may secure and stabilize the spindle assembly 200 and the workpiece 104 during the drilling operation, and for multi-layer workpieces, may advantageously reduce or eliminate interlaminar burrs and prevent drill chips from getting between the layers of materials.

The feed unit 210 of the spindle assembly 200 is actuated to advance the spindle unit 230 along the drilling axis 102 to an extended position 204 until the drill bit 232 engages the workpiece 104 at 306. At 308, the spindle unit 330 is actuated to rotate the drill bit 232, thereby performing the drilling operation on the workpiece 104, as shown in FIG. 5. A rectangular key 239 attached to spindle unit 230 slides in a keyway 175 in the extension housing 174 (FIGS. 7-9), counteracting the drill torque and preventing rotation of the spindle unit 230 relative to the extension housing 174. Upon completion of the drilling operation, the spindle assembly 200 may be withdrawn to the retracted position 202 at 310, and the clamping assembly 140 may be withdrawn to the retraction position 108 at 312. At 314, the method 300 determines whether drilling operations are complete. If not, the method 300 returns to positioning the drilling assembly at the next desired location on the workpiece 104, and the above-reference actions may be repeated to perform additional drilling operations. If drilling operations are determined to be completed at 314, then the method 300 may terminate or continue to other aspects of the manufacturing operations at 316.

Spindle Assembly Embodiment

Figure 7:
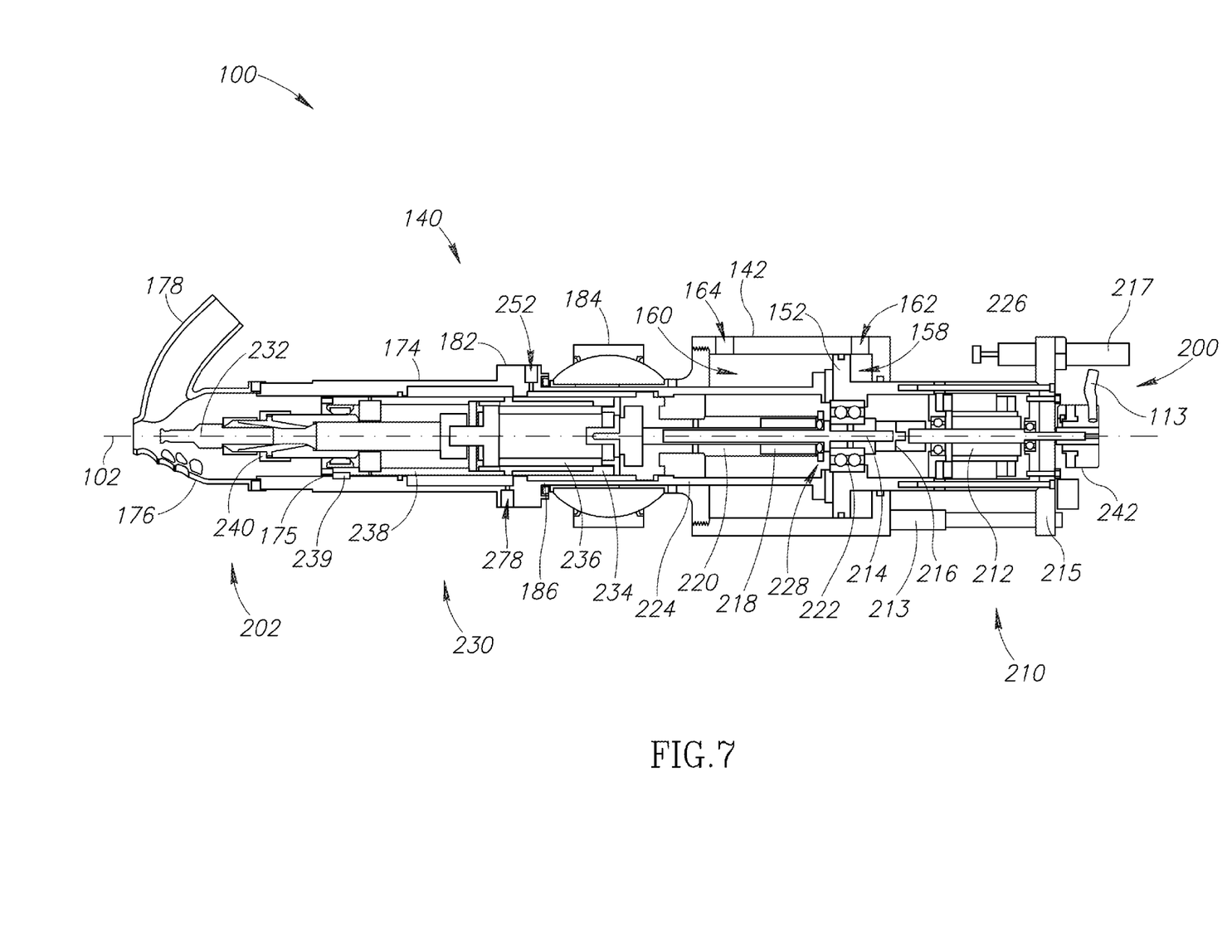
FIG. 7 is a cross-sectional view of the drill assembly of FIG. 1.
Figure 8:
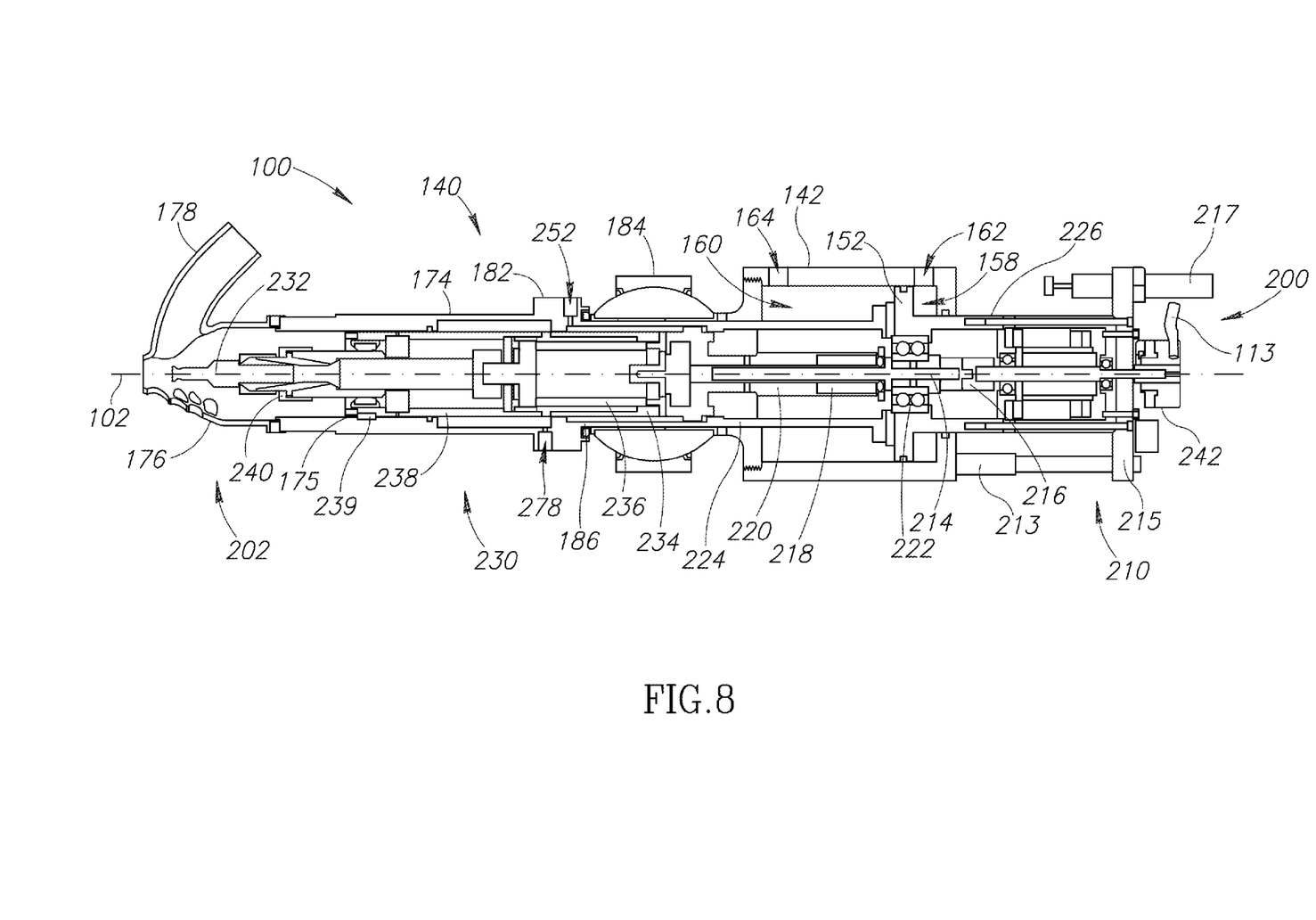
FIG. 8 is a side cross-sectional view of the drill assembly of FIG. 1 with the spindle assembly in the retracted position.
Figure 9:
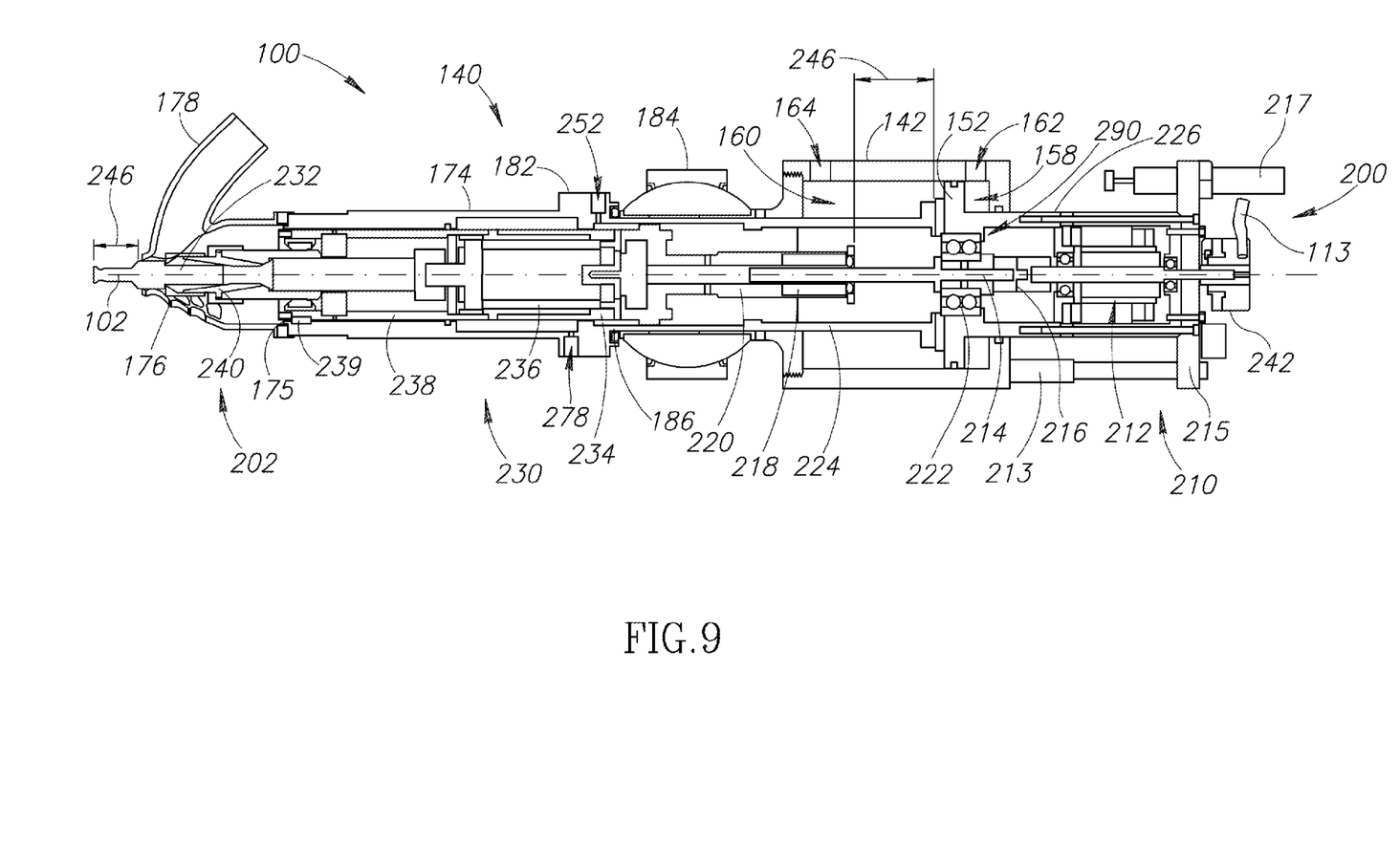
FIG. 9 is a side cross-sectional view of the drill assembly of FIG. 1 with the spindle assembly in the extended position.

Having provided a general overview of the primary components and broad operational aspects of the drill assembly 100, additional specific details and operational aspects of the drill assembly 100 will now be provided. Turning now to FIG. 7, a cross-sectional view of the drilling assembly 100 of FIG. 1 is shown. FIGS. 8 and 9 are side cross sectional views of the drill assembly 100 of FIG. 1, with the spindle assembly 200 in the retracted and extended positions 202, 204, respectively (with the clamping assembly 140 in the retracted position 108 in both figures).

In this embodiment, the feed unit 210 of the spindle assembly 200 includes a feed motor 212 configured to drive (i.e. extend and retract) the spindle unit 230 along the drilling axis 102. The feed motor 212 may be a servomotor, or any other suitable type of feed motor. A roller screw 214 is coupled to the feed motor 212 by a coupling 216. The roller screw 214 extends along the drilling axis 102 and engages a roller nut 218 disposed within a roller nut housing 220. The roller screw 214 is rotatably engaged through a thrust bearing 222 disposed within a spindle housing 224. The combination of the roller screw 214 and roller nut 218 forms a low friction mechanism that may provide a relatively large thrust with a small torque from the feed motor 212.

In alternate embodiments, the roller screw 214 and roller nut 218 may be replaced with any other suitable drive mechanism, including a conventional ball screw. It will be appreciated, however, that the combination of the roller screw 214 and the roller nut 218 typically provide improved resistance to wear and tear, considerably greater axial load carrying capability and are available with smaller lead for greater thrust for a given input torque than ball screws of comparable physical size.

To minimize the feed unit length, a round feed motor 212 with a diameter the same as aft end of spindle housing 224 is used, allowing the feed motor 212 to enter the main housing 142 during the clamping operation. A sleeve (or cover) 226, preferably formed of a low-friction material (e.g. plastic), is coupled to an aft end portion of the spindle housing 224 and encapsulates the feed motor 212 and the aft end of spindle housing 224. In this embodiment, guide rods 213 extend rearwardly from the main housing 142. A base 215 is slideably coupled to the guide rods 213, and is also coupled to the spindle assembly 200 so that as the base 215 slides along the guide rods 213, the spindle housing 224 slides within the main housing 142 and extension housing 174 along the drilling axis 102.

As further shown in FIGS. 7-9, in some embodiments, shock absorbers 217 may be mounted on the base 215. The shock absorbers 217 may be configured to engage the aft end of the main housing 142 when the clamp assembly 140 is positioned in the extended position 108.

Figure 10:
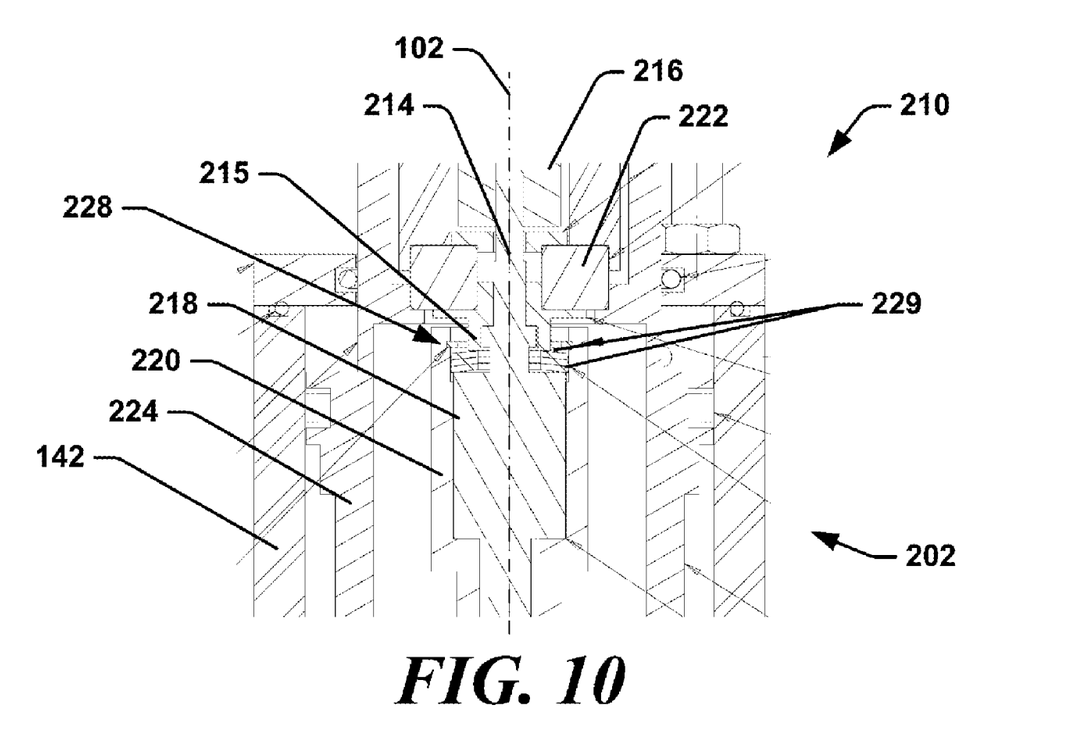
FIG. 10 is an enlarged, side cross-sectional view of a portion of a feed unit of the drilling assembly of FIG. 1.

An overtravel brake 228 (FIG. 7) is disposed between the thrust bearing 222 and the roller nut 218 to prevent overtravel of the roller screw 214, as described more fully below. As shown in FIG. 10, in some embodiments, the overtravel brake 228 includes one or more spring (or Belleville) washers 229. In the retracted position 202, the spring washers 229 of the overtravel brake 228 may become compressed between the roller screw nut 218 and a flange portion 215 of the roller screw 214, decelerating and preventing excessive overtravel of the feed unit 210. In this embodiment there are no travel limit switches or sensors in the feed unit 210. A homing procedure was developed which retracts the spindle quill until the overtravel brake 228 is encountered. The encounter with the overtravel brake 228 is sensed by the control system 420 from commanded position errors via feed encoder 242 or increased feed motor 212 current demands. The feed motor 212 is then reversed and advanced to the next index pulse on the feed encoder 242 at which point the home of aft travel limit position is established.

With continued reference to FIGS. 7-9, in this embodiment, the spindle unit 230 of the spindle assembly 200 includes an air motor housing 234 coupled to a forward end portion of the roller nut housing 220. An air motor 236 is disposed within the air motor housing 234 and is configured to drive a gear box 238. The air motor 236 and the gear box 238 are generally known components and, for the sake of brevity, will not be described in detail herein. In some embodiments, for example, the air motor 236 and the gear box 238 may be of the type commercially-available from Atlas Copco AB of Stockholm, Sweden, or E2 Systems of Borås, Sweden, with modifications (e.g. to the air motor housing 234) as disclosed herein. A spindle collet chuck 240 operatively couples the drill bit 232 to the gear box 238.

As best shown in FIG. 7, a feed encoder 242 may be positioned at an aft end portion of the spindle assembly 200. The feed encoder 242 may monitor an output from the feed motor 212 to enable accurate control of the feed rates and position of the feed unit 210

In operation, the spindle assembly 200 may initially be in the retracted position 202 as shown in FIG. 8. The feed unit 210 may be activated by providing electrical power to the feed motor 212 via lead 111 (FIG. 1). As the feed motor 212 rotates the coupling 216 and the roller screw 214 in a first rotational direction, the roller screw 214 drives the roller nut 218 and the roller nut housing 220 in the forward direction along the drilling axis 102. In turn, the spindle unit 230 and the drill bit 232 are driven forwardly along the drilling axis 102 toward the workpiece 104 by a travel distance (or stroke) 246. Axial loads exerted on the roller screw 214 are reacted against the thrust bearing 222.

In the particular embodiment and extension position 204 shown in FIG. 9, the travel distance 246 shown is approximately 70% of a maximum travel distance that may be achieved using the feed unit 210. The feed encoder 242 monitors the output of the feed motor 212 (e.g. number of rotations, rotational velocity, etc) and outputs appropriate signals via lead 113 to enable accurate determination of the position of the spindle unit 230 and drill bit 232 along the drilling axis 102.

The spindle unit 230 and the drill bit 232 are withdrawn from the workpiece 104 by reversing the rotational direction of the feed motor 212. In turn, this moves the roller nut 218 and the roller nut housing 220 in an aftward direction. As the roller nut 218 nears the thrust bearing 222, the overtravel brake 228 may be engaged, preventing excessive force between the roller nut 218 and the roller screw 216 (or the thrust bearing 222) that might otherwise cause the feed unit 210 to be damaged.

Figure 11:
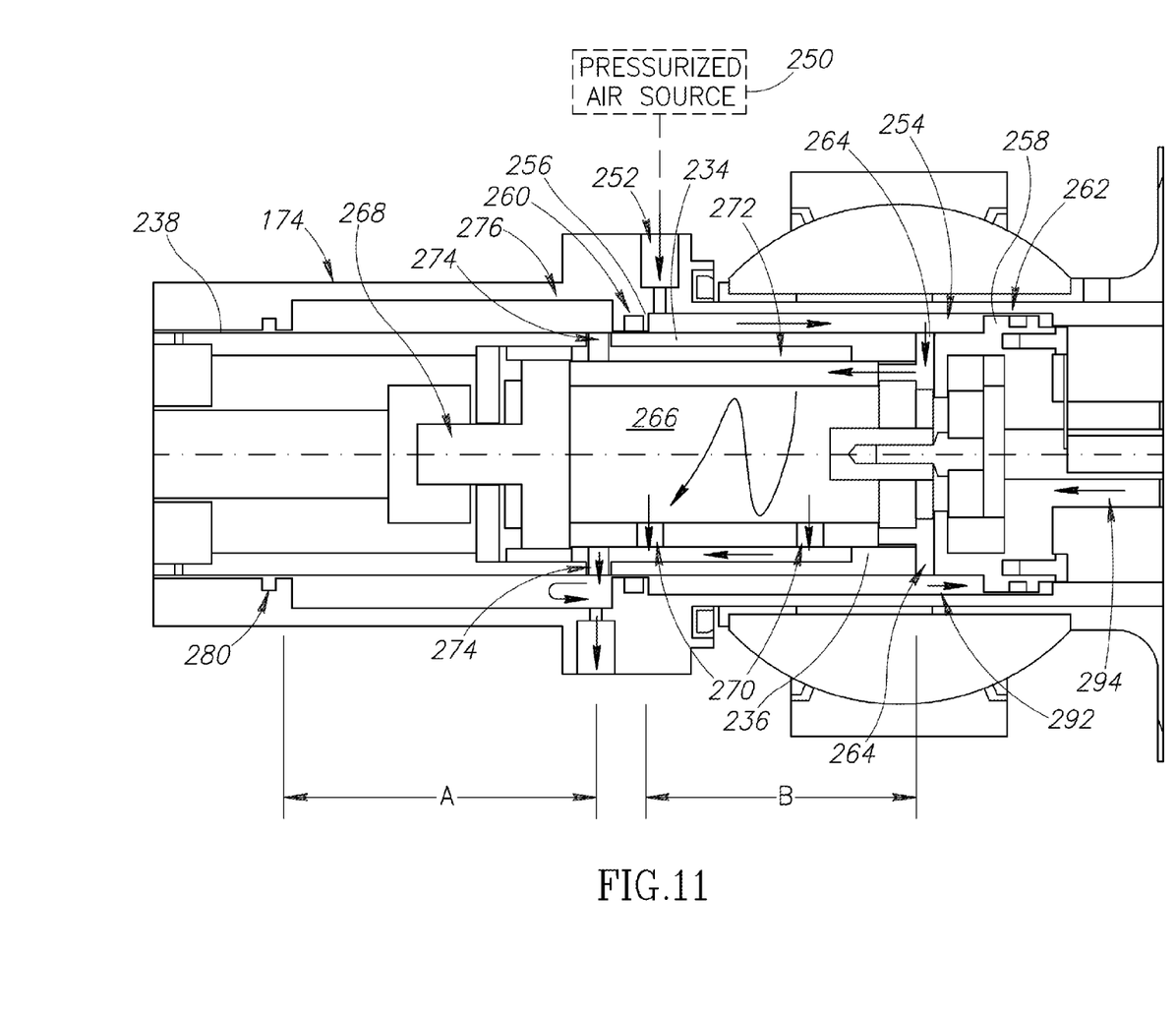
FIG. 11 is an enlarged, side cross-sectional view of a portion of a spindle unit of the drilling assembly of FIG. 1.

The operation of the spindle unit 230 will now be described. As noted above, the air motor 236 of the spindle unit 230 drives the gearbox 238 which, in turn, drives the drill bit 232. More specifically, as best shown in FIG. 11, a flow of compressed air from a source of pressurized air 250 (e.g. pump, pressure vessel, etc.) enters through a primary intake port 252 disposed within the extension housing 174. The compressed air then flows through an intake plenum 254 formed between an inner surface of the extension housing 174 and an outer surface of the air motor housing 234.

In this embodiment, the intake plenum 254 has an approximately annular cross-sectional shape, and is bounded on a forward end by a forward intake separation flange 256, and on an aft end by a rear intake flange 258. It should be noted that, in the embodiment shown in FIG. 11, the forward intake flange 256 depends inwardly from the inner surface of the extension housing 174, while the rear intake flange 258 depends outwardly from the outer surface of the air motor housing 234. A first seal 260 is disposed within the forward intake flange 256, and a second seal 262 is disposed within the rear intake flange 258, to prevent leakage of the compressed air from the forward and aft ends of the intake plenum 254, respectively.

As further shown in FIG. 11, after flowing through the intake plenum 254, the flow of compressed air enters the air motor 236 via motor inlet ports 264 disposed through the air motor housing 234. The compressed air is then expanded within an air motor turbine 266 of the air motor 236, and work is extracted in the form of rotation of an air motor output shaft 268 that is operatively coupled to the gearbox 238. The expanded air flows outwardly from the air motor 236 through air motor exhaust ports 270 (two shown) into a motor cavity 272. The motor cavity 272 has an approximately annular cross-sectional shape, and is formed between an outer surface of the air motor 236 and an inner surface of the air motor housing 234.

The flow of expanded air escapes from the motor cavity 272 through motor housing exhaust ports 274 disposed through the air motor housing 234, and enters an exhaust plenum 276. The exhaust plenum 276 has an approximately annular cross-sectional shape, and is formed between an outer surface of the gearbox 238 and an inner surface of the extension housing 174. As best shown in FIG. 11, the exhaust plenum 276 is bounded on a forward end by an inwardly depending portion of the extension housing 274, and on an aft end by the forward intake flange 256. A forward exhaust seal 280 prevents leakage from the forward end of the exhaust plenum 276, while the first seal 260 prevents leakages from the aft end of the exhaust plenum 276. After traversing the exhaust plenum 276, the expanded air exits the drilling assembly 100 via a primary exhaust port 278 disposed through the extension housing 174.

Embodiments of spindle assemblies in accordance with the teachings of the present disclosure may provide significant advantages over the prior art. For example, because the components of the feed unit 210 are disposed generally axially along the drilling axis 102, the inline direct drive feed of the spindle assembly provides substantially improved rigidity over prior art spindle assemblies. Additional stability is provided by those embodiments having a roller screw and roller nut configuration, as these components advantageously provide greater stability, along with improved load carrying capacity.

Those embodiments of the spindle unit 230 having an intake plenum 254 as described above and shown in FIG. 11 may further enhance the stability of the spindle assembly. More specifically, because the aft end of the intake plenum 254 is formed by the rear intake flange 258 that depends outwardly from the outer surface of the air motor housing 234 (rather than by a flange that depends inwardly from the inner surface of the extension housing 174), an aftwardly-directed force 292 (FIG. 11) is exerted on the aft intake flange 258. The aft force 292 advantageously counteracts and overcomes a forwardly-directed force 294 exerted on the air motor housing 234 by the feed unit 210. In this way, the air motor housing 234 is constantly biased is the aft direction during operation of the spindle assembly 200, thereby reducing or eliminating backlash that would otherwise occur in the components of feed unit 210 during operation of the spindle unit 230, particularly during transitions between forward and aftward feed of the spindle unit 230 by the feed unit 210.

Embodiments of spindle assemblies in accordance with the present disclosure may also provide improved resistance to thermal expansion effects. For example, because the feed motor 212 is positioned in an aft location of the spindle assembly 200, the considerable waste heat generated by the operation of the feed motor 212 may be readily dissipated without adversely impacting the other components of the feed unit 210 or the spindle unit 230. More specifically, the thermal expansion effects due to heating from the feed motor 212 may advantageously be limited to those portions of the spindle assembly 200 aft of a datum surface (or reference plane) 290 (FIG. 11), with the components of the spindle assembly 200 forward of the datum surface 290 being relatively unaffected by heating from the feed motor 212.

Similarly, the configuration of the spindle unit 230 also provides improved resistance to thermal expansion effects. Because the flow of compressed air into the air motor 236 is circuitously flowed through the intake plenum 254 surrounding the air motor housing 234, and the flow of expanded air from the air motor 236 is circuitously flowed through the motor housing 272 and the exhaust plenum 276, the waste heat generated by the operation of the spindle unit 230 is generally well-distributed throughout the components of the spindle unit 230. This results in an approximately constant equilibrium temperature throughout the components of the spindle unit 230. By proper attention to the design of the components of the spindle unit 230 (e.g. materials, dimensions, etc.), the relatively uniform temperature distribution afforded by the spindle unit 230 may result in approximately equal thermal expansions of the axially-extending components of the spindle unit 230 at any given axial station. Because the axially-extending components of the spindle unit thermally expand by approximately equal amounts, the drill depth accuracy of the drilling operations performed using the spindle assembly is substantially enhanced in comparison with prior art devices.

Clamping Assembly Embodiment

Referring again to FIGS. 7-9, the primary components and operational aspects of the clamping assembly 140 will now be described. Additional details and aspects of the clamping assembly 140 are described in the above-referenced, previously-incorporated U.S. patent application No. (t.b.d.) entitled "Concentric Clamping for Drill Spindles" filed concurrently herewith.

In this embodiment, the clamping assembly 140 includes the main housing 142 slideably disposed about a flanged portion 152 of the spindle housing 224. The main housing 142 and the spindle housing 224 cooperatively form an extension chamber 158 on an aft side of the flanged portion 152, and a retraction chamber 160 on a forward side of the flanged portion 152. An extension port 162 extends through the main housing 142 and fluidly communicates with the extension chamber 158. Similarly, a retraction port 164 extends through the main housing 142 and fluidly communicates with the retraction chamber 160. A source of pressurized fluid (e.g. source 250) may be coupled to the extension port 162, and in alternate embodiments, may also be coupled to the retraction port 164.

In operation, the clamping assembly 140 may be actuated into the extended position 108 by flowing a pressurized fluid through the extension port 162 into the extension chamber 158. The pressure within the extension chamber 158 exerts a force on the flange 152 of the spindle housing 224, driving the spindle housing 224, the extension housing 174, and the nosepiece 176 into engagement with the workpiece 104. Similarly, to actuate the clamping assembly 140 into the retracted position 106, the extension chamber 158 may be evacuated and the retraction chamber 160 may be pressurized, thereby withdrawing the nosepiece 176 from engagement with the workpiece 104.

In some embodiments, a spherical bearing 184 may be coupled to a forward portion of the main housing 142. The spherical bearing 184 may enable forward portions of the spindle assembly 200 (e.g. the spindle unit 230 of the spindle assembly 200) to be gimbled into a desired position.

With continued reference to FIGS. 7-9, the extension housing 174 extends forwardly from the spindle housing 224, and a nosepiece 176 is coupled to a forward end of the extension housing 174. In this embodiment, the nosepiece 176 includes a vacuum port 178 that may be coupled to a vacuum source so that extraneous materials produced by the drilling operations may be readily evacuated. In the extended position 108 (FIG. 4), the nosepiece 176 clampably engages the workpiece 104. In the retracted position 106 (FIG. 3), the nosepiece 176 is disengaged from the workpiece 104 until an outwardly projecting flange portion 182 of the extension housing 174 abuts against the spherical bearing 184 (or other forward portion of the main housing 142). In some embodiments, a retract O ring 186 is disposed within an aft edge of the flange portion 182. As the extension housing 174 is withdrawn into the retracted position 108 (FIG. 3), the retract O ring 186 may absorb the shock of the impact between the flange portion 182 and the spherical bearing 184.

Embodiments of spindle assemblies in accordance with the teachings of the present disclosure may be compatible with a greater variety of clamping assemblies than comparable prior art spindle assemblies. More specifically, spindle assemblies having inline direct drive feed are less bulky and lighter weight than comparable prior art spindle assemblies. Thus, spindle assemblies in accordance with the present disclosure may be used with a wider range of clamping assemblies, including the concentrically-disposed clamping assembly 140 described above and shown in the accompanying figures.

Drilling System Embodiment

It will be appreciated that drilling assemblies in accordance with the present disclosure may be implemented in a variety of manufacturing systems designed for a wide variety of drilling applications For example, in one particular embodiment, the clamping assembly 140 can apply clamp loads of greater than 500 lbs, and the spindle assembly 110 can exert a drill thrust greater than 400 lbs. In further embodiments, the entire drilling assembly 100 may be 4.5 inches square and 22 inches long, and may weigh less than 20 lbs. Typical prior art systems with the same load capacity are more than approximately 5 times the weight and size of this design. Using embodiments of the present invention, the complexity and number of parts may be reduced. Also, embodiments of the invention may be less susceptible to contamination of mating surfaces resulting in countersink depth errors than competing prior art systems with independently actuated nose pieces.

Figure 12:
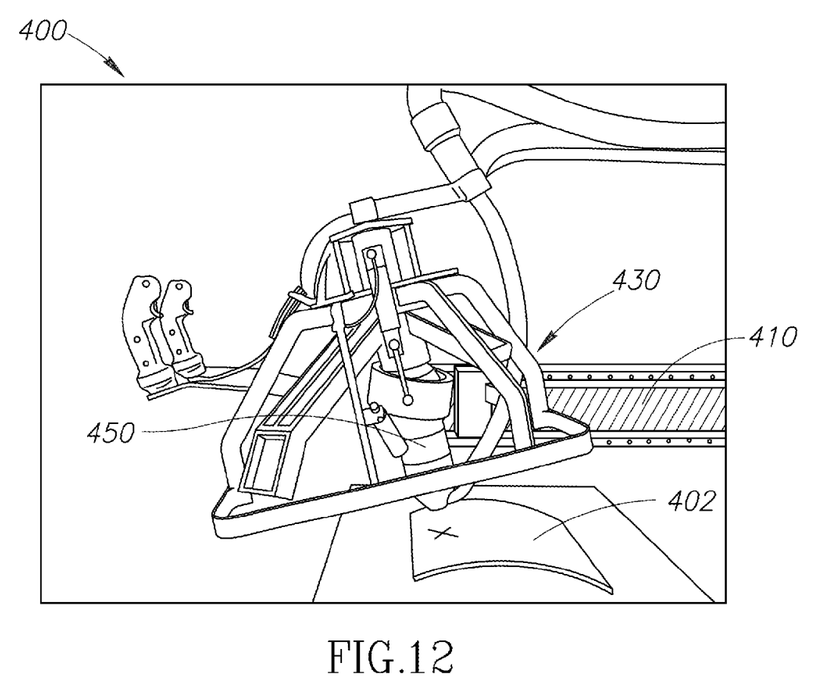
FIGS. 12 and 13 are side elevational views of a drilling system including a drill assembly in accordance with another embodiment of the invention.
Figure 13:
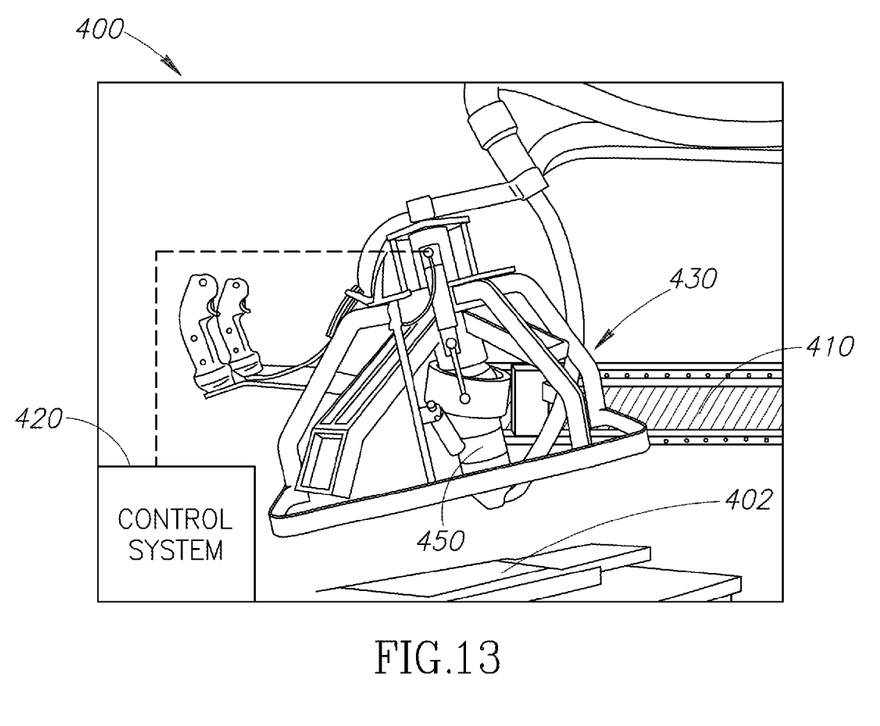

Embodiments of the present invention may also be integrated into existing automated drilling systems of the type that may be used for components and assemblies of commercial vehicles, including aircraft, consumer products, industrial products, and any other desired manufactured products or structures. For example, FIGS. 12 and 13 are side elevational views of a drilling system 400 in accordance with another embodiment of the invention. In this embodiment, the drilling system 400 includes a support structure 410 positioned over a workpiece 402, and a carriage 430 moveably coupled to the support structure 410. A drilling assembly 450 of the type disclosed herein, such as the drilling assembly 100 described above and shown in FIGS. 1-11, is operatively coupled to the carriage 430 for performing manufacturing operations on the workpiece 402. A control system 420 is coupled to the carriage 430 (and possibly also the support structure 410) to provide multi-dimensional, multi-degree of freedom control (e.g. six degree of freedom) control of the position and orientation of the drilling assembly 450 with respect to the workpiece 402. Unless otherwise specified below, the structure and operational aspects of the support structure 410, the control system 420, and the carriage 430 are generally known, and for the sake of brevity, will not be described in detail herein. In some embodiments, these components (support structure 410, control system 420, carriage 430, and other components of the system 400 other than the drilling assembly 450) may be of a type generally disclosed in co-pending, commonly-owned U.S. Application No. 2006/0104734 A1 by Mathis et al., incorporated herein by reference.

While specific embodiments of the invention have been illustrated and described herein, as noted above, many changes can be made without departing from the spirit and scope of the invention. Accordingly, the scope of the invention should not be limited by the disclosure of the specific embodiments set forth above. Instead, the invention should be determined entirely by reference to the claims that follow.

What is claimed is:

1. A spindle assembly, comprising:
a feed unit including a feed motor coupled to a drive mechanism, the feed motor and the drive mechanism being disposed along a longitudinal axis of the spindle assembly; and
a spindle unit having an aft end operatively coupled to the drive mechanism of the feed unit, the spindle unit including a fluid-driven motor coupled to a tool collet chuck, the spindle unit being configured to translate along the longitudinal axis by actuation of the feed motor, the spindle unit to exert an aftwardly-directed force on a motor housing disposed about the fluid-driven motor during actuation of the fluid-driven motor.

2. The spindle assembly of claim 1, wherein the drive mechanism includes:
an elongated roller screw disposed along the longitudinal axis and coupled to an output shaft of the feed motor, the output shaft being approximately aligned with the longitudinal axis;
a roller nut housing having a longitudinally extending bore approximately aligned with the longitudinal axis, the roller nut housing being coupled with the spindle unit; and
a roller nut non-rotatably disposed within the bore and operatively engaged with the roller screw.

3. The spindle assembly of claim 1, wherein the spindle unit includes an
outer housing disposed about the motor housing and radially spaced apart from the motor housing to form an intake plenum, the intake plenum having a forward end being defined by an inwardly depending flange portion of the outer housing, and an aft end being defined by an outwardly depending flange portion of the motor housing.

4. The spindle assembly of claim 1, wherein an outer housing disposed about the motor housing has a primary intake port disposed therethrough in fluid communication with an intake plenum disposed between the motor housing and the outer housing, and the motor housing includes at least one motor intake port disposed therethrough and providing fluid communication between the intake plenum and the fluid-driven motor.

5. The spindle assembly of claim 1, wherein the motor housing is configured to translate along the longitudinal axis with respect to an outer housing disposed about the motor housing during actuation of the feed motor such that an intake plenum disposed between the motor housing and the outer housing varies in size during actuation of the feed motor.

6. The spindle assembly of claim 1, wherein an outer housing disposed about the motor housing is radially spaced apart from the motor housing to form an exhaust plenum, the exhaust plenum having an aft end being defined by the inwardly depending flange portion of the outer housing, and a forward end being defined by a second inwardly depending flange portion of the outer housing.

7. The spindle assembly of claim 1, wherein the motor housing is configured to translate along the longitudinal axis with respect to an outer housing disposed about the motor housing during actuation of the feed motor such that an intake plenum disposed between the motor housing and the outer housing varies in size during actuation of the feed motor.

8. The spindle assembly of claim 1, further comprising a braking mechanism disposed between the feed unit and the spindle unit, the braking mechanism being configured to inhibit movement of the spindle unit along the longitudinal axis to prevent an overtravel condition.

9. A manufacturing system, comprising:
a support structure configured to be positioned proximate a workpiece;
a carriage moveably coupled to the support structure; and
a head assembly coupled to the carriage, the head assembly including:
a spindle assembly, comprising:
a feed unit including a feed motor coupled to a drive mechanism, the feed motor and the drive mechanism being disposed along a longitudinal axis of the spindle assembly; and
a spindle unit having an aft end operatively coupled to the drive mechanism of the feed unit, the spindle unit including a fluid-driven motor coupled to a tool collet chuck, the spindle unit being configured to translate along the longitudinal axis by actuation of the feed motor, the spindle unit to exert an aftwardly-directed force during actuation of the fluid-driven motor.

10. The system of claim 9, wherein the drive mechanism includes:
an elongated roller screw disposed along the longitudinal axis and coupled to an output shaft of the feed motor, the output shaft being approximately aligned with the longitudinal axis;
a roller nut housing having a longitudinally extending bore approximately aligned with the longitudinal axis, the roller nut housing being coupled with the spindle unit; and
a roller nut non-rotatably disposed within the bore and operatively engaged with the roller screw.

11. The system of claim 9, wherein the spindle unit includes:
a motor housing disposed about the fluid-driven motor; and
a outer housing disposed about the motor housing and radially spaced apart from the motor housing to form an intake plenum, the intake plenum having a forward end being defined by an inwardly depending flange portion of the outer housing, and an aft end being defined by an outwardly depending flange portion of the motor housing.

12. The system of claim 9, wherein a motor housing disposed about the fluid-driven motor is configured to translate along the longitudinal axis with respect to an outer housing disposed about the motor housing during actuation of the feed motor such that an intake plenum disposed between the motor housing and the outer housing varies in size during actuation of the feed motor.

13. The system of claim 9, wherein an outer housing disposed about the motor housing is radially spaced apart from a motor housing disposed about the fluid-driven motor to form an exhaust plenum, the exhaust plenum remaining constant in size during actuation of the feed motor.

14. The system of claim 9, further comprising a braking mechanism disposed between the feed unit and the spindle unit, the braking mechanism being configured to inhibit movement of the spindle unit along the longitudinal axis to prevent an overtravel condition.

15. A method of performing a drilling operation, comprising:
providing a spindle assembly configured to perform a drilling operation at a drilling location on a workpiece, the spindle assembly including:
a feed unit having a feed motor coupled to a drive mechanism, the feed motor and the drive mechanism being disposed along a longitudinal axis of the spindle assembly; and
a spindle unit having an aft end operatively coupled to the drive mechanism of the feed unit, the spindle unit including a fluid-driven motor coupled to a tool collet chuck, the spindle unit being configured to translate along the longitudinal axis by actuation of the feed motor, the spindle unit to exert an afwardly-directed force to counteract a forwardly-directed force exerted by the feed motor;
operating the feed unit to drive the spindle unit toward the workpiece; and
operating the spindle unit to perform the drilling operation at the drilling location on the workpiece using the spindle assembly.

16. The method of claim 15, wherein providing the feed unit includes:
providing an elongated roller screw disposed along the longitudinal axis and coupled to an output shaft of the feed motor, the output shaft being approximately aligned with the longitudinal axis;
providing a roller nut housing having a longitudinally extending bore approximately aligned with the longitudinal axis, the roller nut housing being coupled with the spindle unit; and
providing a roller nut non-rotatably disposed within the bore and operatively engaged with the roller screw.

17. The method of claim 15, wherein providing the spindle unit includes:
providing a motor housing disposed about the fluid-driven motor; and
providing an outer housing disposed about the motor housing and radially spaced apart from the motor housing to form an intake plenum, the intake plenum having a forward end being defined by an inwardly depending flange portion of the outer housing, and an aft end being defined by an outwardly depending flange portion of the motor housing.

18. The method of claim 15, wherein operating the feed unit to drive the spindle unit including translating a motor housing disposed about the fluid-driven motor along the longitudinal axis with respect to an outer housing disposed about the motor housing such that an intake plenum disposed between the motor housing and the outer housing varies in size.

19. The method of claim 15, wherein providing the spindle unit includes:
providing a motor housing disposed about the fluid-driven motor; and
providing an outer housing disposed about the motor housing and radially spaced apart from the motor housing to form an exhaust plenum, and wherein the exhaust plenum does not vary in size as the motor housing is translated along the longitudinal axis.

20. The method of claim 15, further comprising:
operating the feed unit to retract the spindle unit away from the workpiece; and
inhibiting movement of the spindle unit along the longitudinal axis using a braking mechanism disposed between the feed unit and the spindle unit to prevent an overtravel condition.

* * * * *